Figure 1:
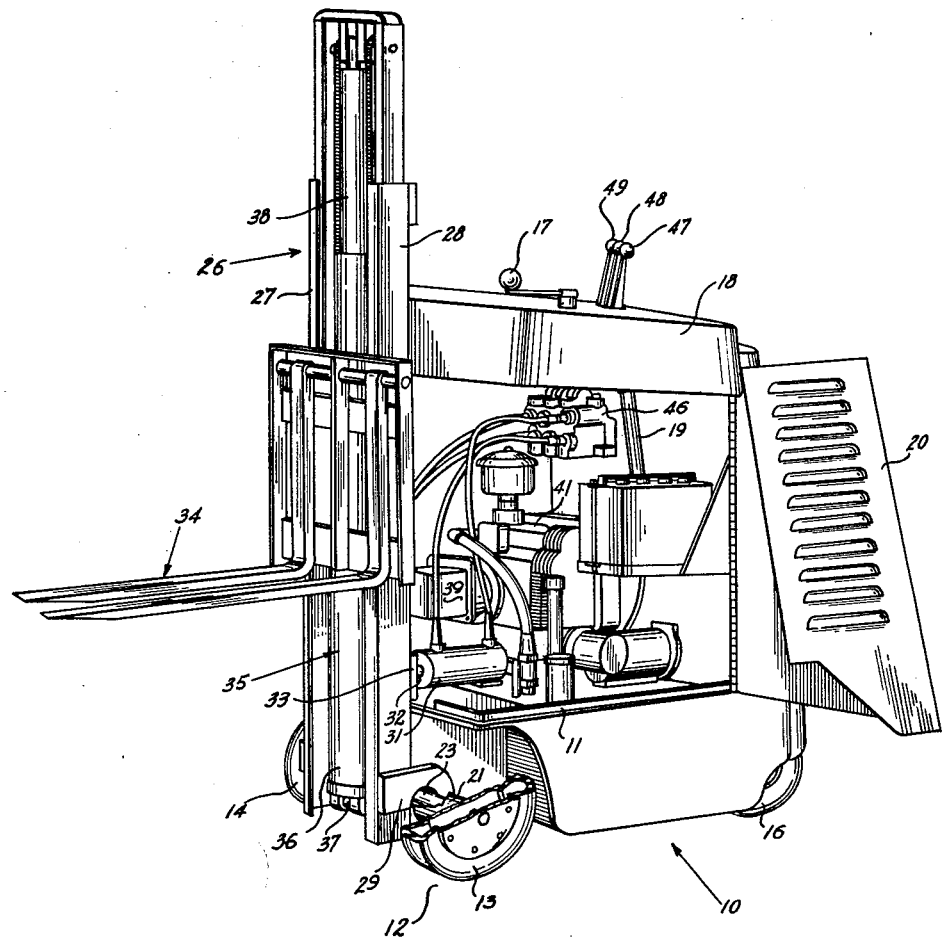

Dec. 29, 1964     E. K. HANSEN     3,163,008
HYDRAULIC DRIVE SYSTEM

Filed April 9, 1963     2 Sheets-Sheet 1

INVENTOR.
ELMER K. HANSEN

BY *Rudolph L. Lowell*

ATTORNEY.

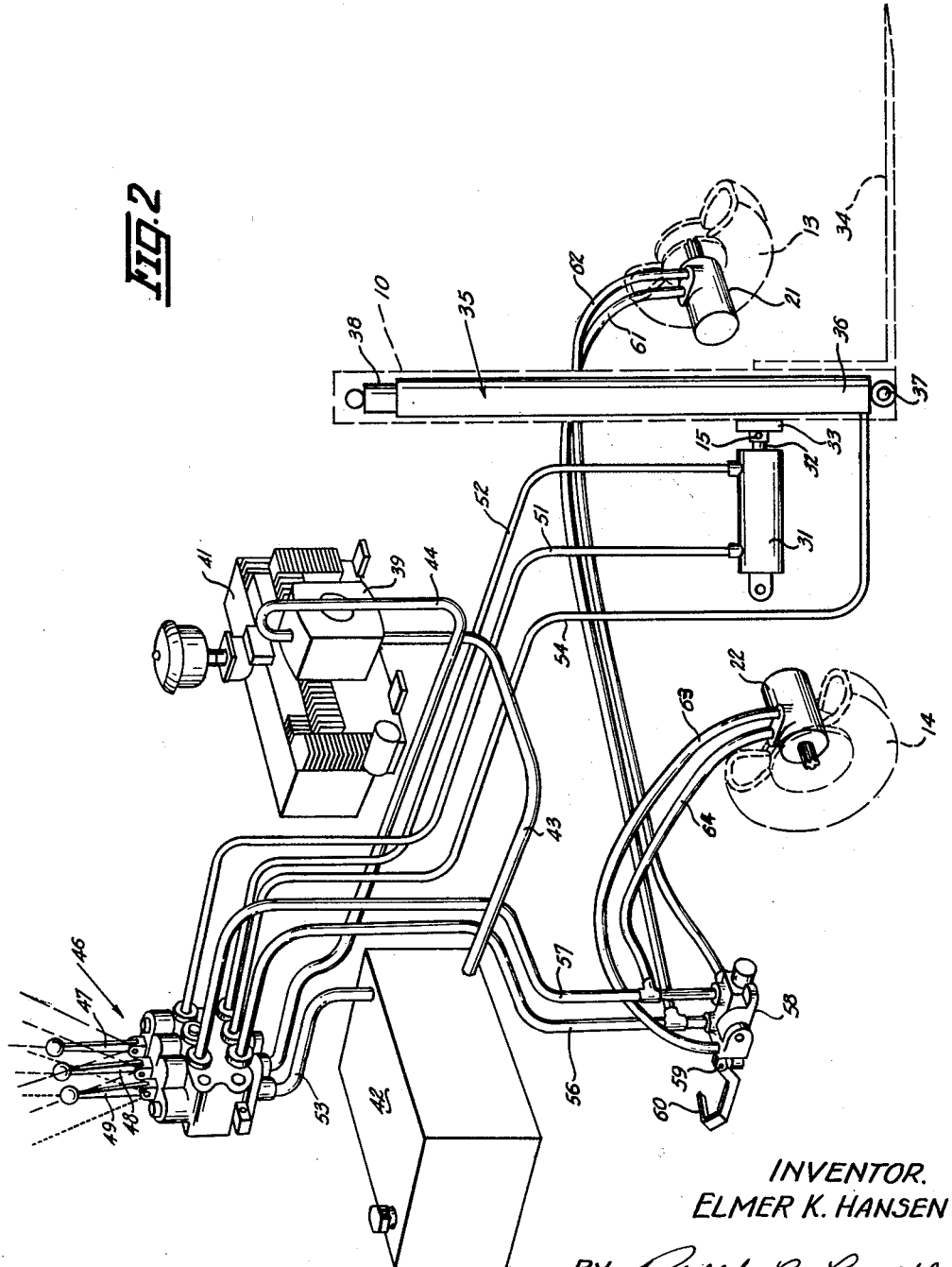

United States Patent Office 3,163,008
Patented Dec. 29, 1964

3,163,008
HYDRAULIC DRIVE SYSTEM
Elmer K. Hansen, 126 Cecilia, Sioux City, Iowa
Filed Apr. 9, 1963, Ser. No. 271,627
2 Claims. (Cl. 60—97)

This invention relates to a motor vehicle drive system and more particularly to a hydraulic power transmission and fork control system for a motor driven vehicle having a fork lift.

It is the object of the invention to provide an improved hydraulic power transmission system, for a fork lift vehicle, which is operable to transfer power from a motor to the drive wheels of the vehicle.

Another object of the invention is to provide in a motor vehicle, a hydraulic power transmission system which utilizes one pump unit to selectively drive the wheels of the vehicle at a high speed or at a slow speed with a high torque.

A further object of the invention is to provide a fork lift motor vehicle with a hydraulic drive system which is integrated with the hydraulic control system for the fork lift and is operable separately therefrom.

An additional object of the invention is to provide a reliable and rugged hydraulic power transmission system for a motor vehicle which is efficient and versatile in use yet economical in cost.

The exact nature of the invention and other objects and advantages thereof will become readily apparent from the consideration of the following specification relating to the accompanying drawing, wherein:

FIG. 1 is a perspective view of a fork lift vehicle which embodies the hydraulic drive system of the invention; and FIG. 2 is a schematic diagram of the hydraulic power transmission and fork control system of the invention.

Referring to the drawing, there is shown in FIG. 1 a fork lift vehicle 10 equipped with the hydraulic power transmission system of this invention. The vehicle 10 comprises a frame 11 which is supported on a floor or ground surface 12 by means of a pair of front drive wheels 13 and 14 and a steering caster wheel 16. The steering tiller 17 is mounted on top of the hood 18 which extends over the frame 11 and is connected by a shaft 19 to the caster wheel 16. The hood 18 covers an engine cavity which is enclosed by side panels 20. Angular movement of the steering tiller 17 rotates the caster wheel 16 about a vertical axis enabling the vehicle to turn in a relatively small radius.

The front wheels 13 and 14 (FIG. 2) are driven by separate hydraulic traction motors 21 and 22 of an orbitrol gear-type. These motors are commercial units manufactured as Model GK-9 by The Char-Lyn Co., Minneapolis, Minnesota. The motors 21 and 22 are mounted on a pair of stub shafts 23, one of which is shown in FIG. 1, and which are secured to opposite sides of the frame 11 and extend laterally outward therefrom.

An upwardly extended mast 26 is pivotally mounted on the stub shafts 23. The mast 26 has a pair of parallel telescoping channel beam units 27 and 28. A hook-shaped plate 29 is secured to and extended rearwardly from the lower end of the outside channel of each unit. Each plate 29 is positioned over an associated lateral stub shaft 23 secured to the front section of the frame 11.

The mast 26 is adjustably held in an upright position by a double acting cylinder assembly 31 which is mounted longitudinally on the frame 11 and has a piston rod 32 pivotally connected to a plate 33 secured to the outside channel of each beam unit. The cylinder assembly 31 operates to control the tilt position of the mast 26 by pivoting the mast on the stub shafts 23.

A fork assembly 34 is mounted for up and down movement on the channel units 27 and 28 by means of vertically spaced rollers (not shown) positioned within the inner channels of each beam unit. The fork assembly 34 is raised and lowered by means of an elongated hydraulic cylinder assembly 35 which is positioned between the channel units 27 and 28. The cylinder assembly 35 comprises a cylinder 36 pivotally mounted on the forward portion of the frame 11 by means of a transverse pin 37 and a piston 38 secured to the fork assembly 34. When fluid under pressure is supplied to the lower or head end of the cylinder 36 the piston 38 moves in an upward direction to raise the fork assembly 34 and extend the pairs of telescoping channel units 27 and 28.

The source of hydraulic pressure for the separate traction motors 21 and 22 and the cylinder assemblies 31 and 35 is established by an internal gear pump 39 which is driven by an internal combustion engine 41 mounted on the frame 11.

The hydraulic drive and control system for the fork lift vehicle 10 is shown in FIG. 2. The pump 39 withdraws hydraulic fluid from a reservoir 42 connected to the pump by hose 43 and discharges fluid under pressure through a hose 44 to a master control valve assembly 46 which contains three control valves having operator control handles 47, 48 and 49. The master control valve is a commercial unit manufactured as Model No. 25P-439-D by the Gresen Mfg. Co., Minneapolis, Minnesota.

The fluid flow between the cylinder assembly 31 and the valve assembly 46 is directed by means of a pair of flexible hoses 51 and 52. The control handle 47 has three operating positions, indicated by the broken lines, which regulate the flow of liquid under pressure to the cylinder 31. When the control handle 47 is in its neutral position fluid does not flow to or from the cylinder assembly 31 thereby locking the piston therein in a fixed position. When the handle 47 is moved to its first position the control valve operated thereby directs fluid under pressure through the hose 51 to the head or rear end of the cylinder assembly 31 and permits the fluid in the forward or rod end of the cylinder assembly 31 to flow through the hose 52 through the valve assembly 46 which discharges the fluid through a hose 53 back to the reservoir 42. When the control handle 47 is moved to its second position the flow of the fluid in hoses 51 and 52 is reversed thereby providing a supply of fluid under pressure to the rod end and exhausting fluid from the head end of the cylinder assembly 31.

The handle 48 is operative to supply hydraulic fluid under pressure to a hose 54 connected to the upright cylinder assembly 35. The control handle 48 is movable from a first position to a neutral position into a second position as shown by the broken line. In the first position fluid under pressure is directed through the hose 54 to the head end of the cylinder assembly 35 thereby raising the piston 38 and fork assembly 34. When the handle 48 is in the neutral position the flow of hydraulic fluid into and out of the cylinder 36 is stopped thereby holding the piston 38 in its extended position. When the handle 48 is moved to its second position the fluid in the cylinder assembly 35 is permitted to flow back to the valve assembly 46 and out through the hose 53 into the reservoir 42 thereby permitting the fork assembly to move downwardly toward the floor or ground.

Operation of the control handle 49 directs fluid under pressure to and exhausts hydraulic fluid from the separate traction motors 21 and 22 so that they may function to develop a driving torque which is transmitted to the drive wheels 13 and 14. First fluid conducting hoses 56 and 61 connect the valve assembly 46 with the traction motor 21 and second fluid conducting hoses 57 and 64 connect the valve assembly 46 with the traction motor 22. The control handle 49 is movable from a neutral position to prevent the flow of fluid in the first and second hoses 56, 61 and 57, 64, respectively, and movable to first and second positions, indicated by the broken lines, to reverse the flow of fluid in the respective hoses 56, 61 and 57, 64 thereby changing the sense of the torque developed by the traction drive motors 21 and 22.

The coordinated flow of fluid to the traction motors 21 and 22 is regulated by a fluid flow selector valve means 58 which has an actuating lever 59 connected to a toe control 60 mounted on the rear section of the frame 11. The valve means 58 is a commercial unit manufactured as Model No. G–SP–4D NR by the Gresen Mfg. Co., Minneapolis, Minnesota. The valve means 58 is connected in a fluid relationship with the first hose 56 and the second hose 57. Hoses 62 and 63 couple the valve means 58 with the separate hydraulic traction motors 21 and 22, respectively. The toe control 60 is operative to move the actuating lever 59 between a first and second position. In the first position, the valve means 58 directs a series flow of fluid to the traction motors 21 and 22 to drive them at a high rate of speed. When the vehicle is driven in a forward direction the fluid under pressure from the pump 39 flows through the third valve of the master control valve assembly 46 into the first hose 56. From the first hose 56 the flow of fluid passes through the hose 61 to the traction motor 21 and is exhausted therefrom through the hose 62 into the selector valve means 58. Fluid under pressure is diverted by the selector valve means 58 into the hose 63 which feeds the fluid under pressure to the hydraulic traction motor 22. The fluid exhausted from the motor 22 via hose 64 is carried back to the master control valve assembly 46 by the second hose 57. The valve assembly 46 discharges the fluid into the reservoir 42 through the hose 53. It is thus seen that the hydraulic fluid is exhausted from motor 21 into motor 22 so that the motors are fluid connected in series. When the traction motors 21 and 22 are thus connected to receive a series flow of fluid under pressure they are driven at a high speed with a relatively low torque output.

In order to reduce the speed of the traction motors 21 and 22, the actuating lever 59 for the fluid flow selector valve means 58 is moved by the toe control 60 to a second position which directs a parallel flow of hydraulic fluid under pressure to the traction motors 21 and 22.

When it is desired to move the fork lift vehicle 10 forward at a slow speed the operator control handle 49 is moved to its first position thereby directing fluid under pressure into the first hose 56 and exhausting the fluid from the second hose 57 back to the reservoir 42. The flow of fluid in the first hose 56 is divided into two components. The hose 61 feeds fluid under pressure to the motor 21. The hose 56 feeds fluid under pressure to the selector valve means 58. For slow speeds the actuating lever 59 of the selector valve means is moved to a second position which fluidly interconnects the hose 56 with the hose 63 thereby supplying the hydraulic traction motor 22 with a component of the flow of the hydraulic fluid in the first hose 56. The hydraulic fluid exhausted from the traction motor 21 is carried by the hose 62 to the selector valve means 58 and which directs the exhaust fluid to the second hose 57 which also receives the exhaust hydraulic fluid from the traction motor 22 by means of hose 64.

In order to drive the fork lift vehicle 10 in a reverse direction the operator control handle 49 of the master control valve assembly 46 is moved to its second position thereby directing fluid under pressure into the second hose 57 and exhausting fluid from the first hose 56. The flow of hydraulic fluid through the traction motor 22, the fluid flow selector valve means 58, and the traction motor 21, is reversed thereby effecting a rearward movement of the vehicle.

In summary the hydraulic power transmission system utilizes a single pump unit 39 and a flow selector valve means 58 to drive the wheels 13 and 14 of the vehicle selectively at a high speed or at a slow speed with a high torque. The flow selector valve means 58 receives a supply of fluid under pressure from the pump 39 and is selectively operable to direct a parallel flow of hydraulic fluid to separate hydraulic traction motors to produce a slow speed and a high torque drive output or to direct a series flow of hydraulic fluid to hydraulic traction motors to produce a high speed and low torque drive output.

While there have been shown, described, and pointed out the fundamental novel features of the invention as applied to the preferred embodiment, it is to be understood that various omissions, substitutions, changes in form, and details of the system illustrated may be made by those skilled in the art, without departing from the spirit of the invention. It is intended to be limited only as indicated by the scope of the following claims.

I claim:
1. A power transfer system for a vehicle having an engine and a plurality of drive wheels comprising:
   (a) reservoir means for storing fluid,
   (b) pump means drivably connected to said engine and connected in direct fluid communication with said reservoir means, said pump means being operable to withdraw fluid from said reservoir means to discharge a supply of fluid under pressure,
   (c) separate motor means connected to each of said drive wheels for transmitting torque thereto,
   (d) conduit means for directing the supply of fluid under pressure to said motor means,
   (e) first valve means interposed in said conduit means and connected in a fluid conducting relation with said reservoir means, said first valve means being selectively operable to stop the flow of fluid to said motor means to terminate the torque transferred to said drive wheels, or to reverse the flow of fluid to said motor means thereby changing the sense of the torque applied to said motor means, and to discharge fluid from said motor means to said reservoir, and
   (f) second valve means connected in a fluid conducting relation with said motor means, said second valve means having a manually operated actuating member movable to a first position connected to said first valve means for receiving fluid therefrom and selectively operable to direct a parallel flow of fluid to said motor means to produce a slow speed and high torque drive output and movable to a second position to direct a series flow of fluid to said motor means to produce a high speed and low torque drive output.

2. A hydraulic power transfer system for a fork lift vehicle having an engine, a pair of drive wheels, and hydraulic cylinder means for tilting and raising the fork of said vehicle comprising:
   (a) reservoir means for storing liquid,
   (b) pump means drivably connected to said engine and connected in direct fluid communication with said reservoir means, said pump means being operable to withdraw liquid from said reservoir means and to discharge a supply of liquid under pressure,
   (c) separate hydraulic motor means connected to each of said drive wheels for transmitting torque thereto,
   (d) conduit means for directing the supply of liquid under pressure to said hydraulic cylinder means and hydraulic motor means,
   (e) first valve means interposed in said conduit means and connected in a fluid conducting relation with said reservoir means, said first valve means being selectively operable to direct liquid under pressure to said cylinder means and to each of said motor means, to stop the flow of liquid to said cylinder means and motor means to terminate the torque transferred to said drive wheels, to reverse the flow of liquid to said motor means thereby changing the sense of the torque applied to said motor means, and to discharge liquid from said motor means and hydraulic cylinder means back to said reservoir, and (f) second valve means interposed in said conduit means so as to be connected in a fluid conducting relation with said first valve means for receiving liquid therefrom and connected in a fluid conducting relation with each of said hydraulic motor means, said second valve means having a manually operated actuating member movable to a first position to direct a parallel flow of liquid to said motor means to produce a slow speed and high torque drive output and movable to a second position to direct a series flow of liquid to said motor means to produce a high speed and low torque drive output.

References Cited in the file of this patent

UNITED STATES PATENTS

| | | |
|---|---|---|
| 2,060,220 | Kennedy | Nov. 10, 1936 |
| 2,541,290 | Robinson | Feb. 13, 1951 |
| 2,768,500 | Tyler | Oct. 30, 1956 |
| 2,903,852 | Bottoms | Sept. 15, 1959 |
| 3,005,562 | Shaffer | Oct. 24, 1961 |